Patented June 1, 1943

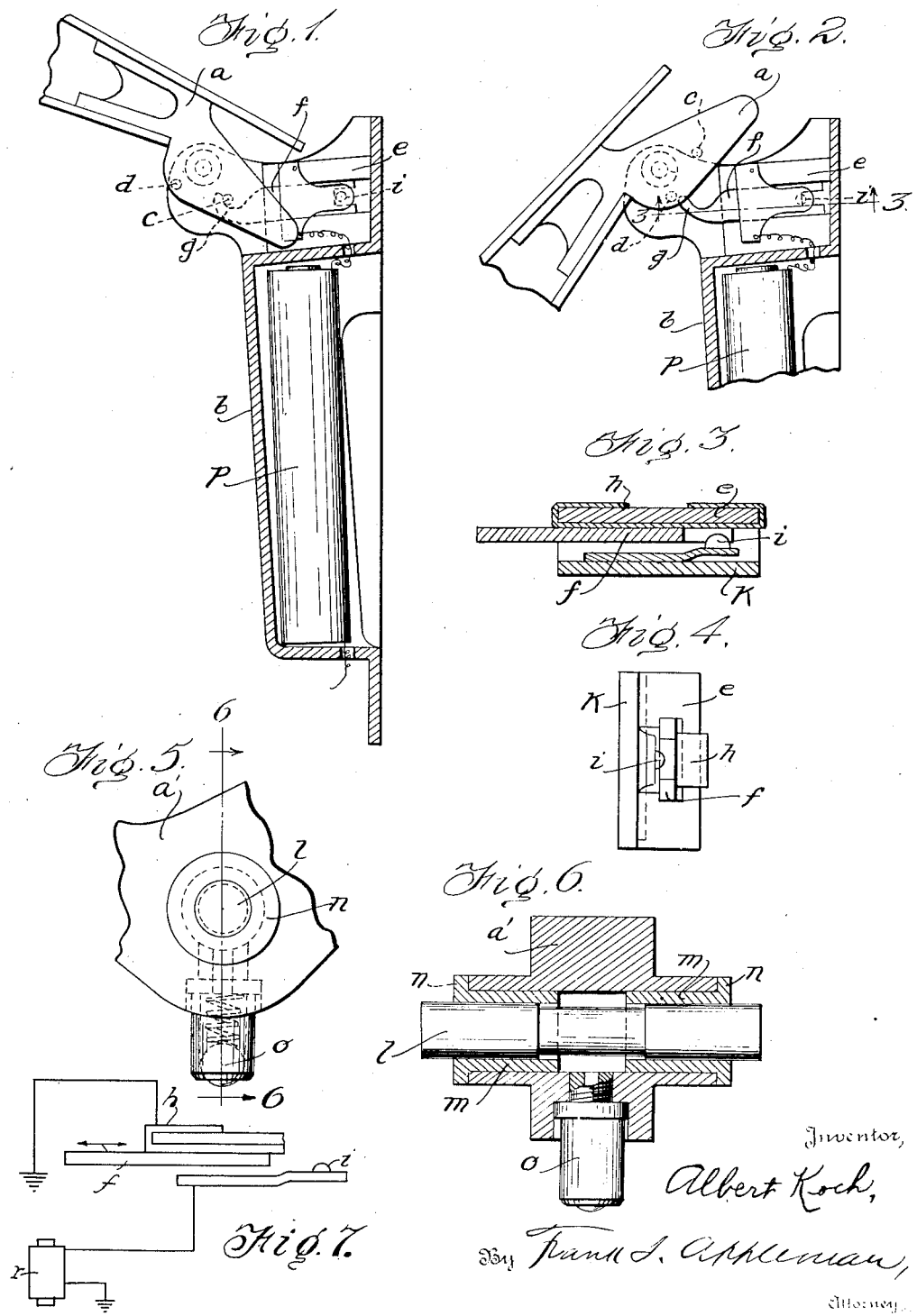

2,320,615

UNITED STATES PATENT OFFICE 2,320,615

DIRECTION INDICATOR FOR MOTOR CARS

Albert Koch, Stuttgart, Germany; vested in the Alien Property Custodian

Application August 30, 1939, Serial No. 292,723
In Germany August 30, 1938

3 Claims. (Cl. 172—126)

This invention relates to a direction indicator for motor cars. More especially, it relates to an electromagnetically operated pendulum direction indicator comprising a vertically oscillating signal arm and an interrupter controlled by said arm.

The invention aims at providing a direction indicator of the above-mentioned type, the interrupter of which requires only little space, as well as only very little power for being actuated. This problem is solved by the provision of a slide as the movable contact member of the interrupter, and of an elastic counter contact, relatively to which said slide is shiftable.

The interrupter of the thus improved direction indicator can advantageously be arranged behind the axle of the signal arm in a free space between the core of the magnet and the wall of a casing or frame supporting said magnet, and the said slide may have a hook-shaped end directed towards said axle and cooperating with abutments provided at the said arm in different distances from the axle of the same, the said hook-shaped member and said abutments cooperating in such a manner that the more remote abutment engages said hook, whereas the other abutment slides along the same.

In order to prevent dirt and moisture from gaining access to the interrupter, the latter may be designed in a simple and cheap manner as a closed unit in such a manner that the slide is arranged in a groove of a non-conducting closed guide member enclosing the elastic counter-contact, and is conductively connected with the source of current by means of a spring insulated relatively to said latter contact.

The interrupter designed in this manner can conveniently be installed later into an existing direction indicator having a signal arm which is stationary in its position of use, whereby indicators of this type may be changed to indicators of the type in which the signal arm oscillates in a vertical direction. In order to render this change possible the abutment members for actuating the interrupter are arranged upon a disk attached to the hub of the signal arm.

It is likewise possible to combine the interrupter advantageously with the casing or frame supporting the electromagnet by using a non-conducting material, for instance an artificial resin, for said casing or frame and letting the guide member of the interrupter form a part of said frame.

In order that the resistance, due to the action of the interrupter, and the bearing friction of the signal arm be as small as possible and to warrant thereby an unobjectionable operation of the direction indicator, even if the signal arm is exposed to a strong air pressure at a very high speed of the car provided with this improved direction indicator, the bearing supporting said arm may be provided with a lubrication device. It is, for this purpose, that the bore in the bearing of the hinge member pertaining to the signal arm is enlarged to provide a communication between said enlargement and a lubrication device of any known type, for instance a lubrication nipple or a grease box or the like. In order that the friction-producing surface of said bearing be as small as possible, the middle portion of the hinge axle may be stepped or tapered.

Especially as regards direction indicators having hinge members of a light metal, a very simple and suitable design of the bearing supporting the signal arm may be attained making the entire width of the bore of the hinge member forming part of said bearing, larger than the diameter of the axle of the signal arm, and to insert into said enlarged bore two bearing boxes having such an axial length that there remains, between their oppositely located ends, a space for the reception of the lubricant. It is then possible to dispense with the customary loose disks located between the hinge member and the bearing cheeks, in that the bearing boxes project over said member and abut with flanges against it.

The invention is illustrated diagrammatically and by way of example on the accompanying drawing on which Figure 1 is a longitudinal section through the driving device of the direction indicator, the interrupter being in open state; Figure 2 is a similar section, the interrupter being, however, in closed state and the lower portion of the figure being omitted. Figure 3 is a transverse section through the opened interrupter on the line 3—3 of Fig. 2. Figure 4 is a rear view of the interrupter. Figure 5 is a side-view of the bearing supporting the hinge member of the signal arm, this figure being drawn to a greatly enlarged scale relatively to Figs. 1 and 2. Figure 6 is a section vertically through the center of the bearing shown in Fig. 5, and on the line 6—6 of Fig. 5, likewise drawn to that enlarged scale, and Figure 7 is a diagram showing the wiring system embodied in the device.

In the drawing, $a$ denotes the signal arm, of which only a portion is indicated in Figs. 1 and 2. This arm per se is of known design and its inner end acts as an armature which coacts with the electromagnet, and said arm is supported on a casing or frame b, in which is housed the electromagnet indicated in the Figs. 1 and 2 by reference character p. Near the axle of said arm are provided two laterally projecting abutment members c and d, of which c is more remote than d from said axle. On the casing b is also provided a guide piece e made of a non-conducting material, for instance an artificial resin. In a groove of said guide piece is arranged a metallic slide f which constitutes the movable contact member of the interrupter, the end g of which is directed towards the axle of the signal arm. Said guide groove has preferably a dove-tailed shape and in it is arranged a thin leaf spring h adapted to yield easily to a slight pressure. Above the open side of the guide groove is a contact spring i so arranged that its contacting portion bears upon the slide f. Said spring i is so embedded in the guide piece e that this can be covered with a plate k on the side of the spring i. Also the casing b enclosing the electromagnet may consist of a non-conducting material, for instance an artificial resin, and the guide piece e may in this case form a part of said casing. The interrupter is connected up to the circuit in such a manner that the one end of the winding of the electromagnet is conductively connected with the contact spring i, and the slide f is conductively connected with the ground across the guide spring h.

Referring now more particularly to the Figs. 5 and 6, a' denotes the hinge portion of the signal arm a which is preferably made of a light metal. l is the axle for said arm and is stepped in its middle portion and supported at its ends, for instance, in bearings provided on the casing b.

The entire width of the bore of the bearing supporting the hinge portion a' of the signal arm is larger than the diameter of the axle l, and in the annular space thereby obtained are inserted two bearing sleeves m consisting of a suitable material, for instance brass or the like. The wall thickness of said sleeves is such that these latter are immovable in the portion a' but can rotate on the axle l. The length of said sleeves is such that a space remains between their oppositely located inner ends. At each of the other ends is a flange n which lies outside of the portion a' and contacts therewith.

Into the portion a' is inserted a lubrication nipple o of any known type which may be connected with a high-pressure lubrication pump and which terminates into the above-mentioned space between the sleeves m. I wish it, however, to be understood that instead of said nipple a grease box or any other lubrication device can be connected to the said space.

The new lubrication means designed and arranged as just described presents not only the advantage that the bearing of the signal arm can be reliably lubricated, but causes the lubrication intermittently under a certain increased or high pressure so that failing of the lubrication because of too great friction between the members composing the signal arm cannot possibly occur.

The manner of action of the present improved direction indicator is as follows:

When the exciting current for the driving electromagnet has been switched on and the signal arm is being swung upwards, then the abutment member c will, towards the end of that upward movement, engage the hook g and will draw the slide f into the position shown in Fig. 1, whereby the interrupter will be opened and the circuit of the electromagnet will be broken. When thereupon the signal arm is moved downwards, the abutment member d will engage the hook g on the outer side thereof and will shift the slide rearwardly into the position shown in Fig. 2 whereby the interrupter and the exciting current will again be closed.

This action takes place continuously until the magnet current is switched off. Then the abutment member d, after having shifted the slide f into the position shown in Fig. 2, will move past the point of the hook g and the signal arm will assume the position of rest. The only frictional resistance to be overcome is that exerted by the slide f, but this resistance is very slight. The frictional resistances otherwise arising between the members of the signal arm bearing are practically completely overcome by the lubrication device described.

The extent and the shape of the oscillations of the arm a are determined by the position of the abutment members c and d and the distance between them. By a suitable arrangement of these members any desired shape and size can be obtained.

The new direction indicator excels the known ones by the features that the interrupter is extraordinarily simple as regards the arrangement and combinations of its parts and that its operation is perfectly reliable, in that the interrupter contact is completely encased in spite of the small size of the interrupter so that no dirt can find access to the contact surfaces which are, moreover, self-cleaning. Finally, the power required for the actuation of the indicator is very slight so that an unobjectionable operation is warranted also at a very high speed of the car for instance on long-distance roads.

I claim:

1. In an interrupter for electric circuits, an arm adapted to oscillate vertically in its position of use, electromagnetic means adapted to actuate said arm, arm actuated means to control said electromagnetic means, comprising an interrupter including a slidably movable contact member, a stationary contact member, an elastic contact member spaced from said stationary contact member, said slide being adapted to connect said elastic contact member with said stationary contact member, and means on said arm for actuating said slide, said arm having an axle, said slide being arranged behind said axle, a means supporting said slide and contacts, said slide being provided with a hook-shaped end directed towards said arm, said arm being provided with two abutment members arranged at varying distances from the axle of the said arm, said abutment members being adapted to cooperate with said hook-shaped end of said slide in such a manner that one abutment actuates said slide in one direction as said arm is moved to one position and said other abutment actuates said slide in the opposite direction as said arm is moved to an opposite position.

2. A circuit interrupter including an oscillatable arm actuated by gravity in one direction and electromagnetic means for actuating said arm in the other direction, a make and break switch for intermittently energizing said means, comprising a substantially closed casing mounting oppositely disposed spaced contacts, a conductive slide reciprocally mounted in said casing and adapted to be slid from a position between and connecting said contacts to a position clear of said contacts, means on said arm engageable with said slide to actuate the same to said second position as said arm swings upwardly, and means on said arm engageable with said slide to actuate the same to said first position as said arm drops by gravity.

3. A circuit interrupter including an oscillatable arm actuated by gravity in one direction and electromagnetic means for actuating said arm in the other direction, a make and break switch for intermittently energizing said means, comprising a substantially closed casing mounting oppositely disposed spaced contacts, a conductive slide reciprocally mounted in said casing and adapted to be slid from a position between and connecting said contacts to a position clear of said contacts, means on said arm engageable with said slide to actuate the same to said second position as said arm swings upwardly, and means on said arm engageable with said slide to actuate the same to said first position as said arm drops by gravity, said means on said arm both comprising abutment members, and a cylindrical formation on said arm mounting said members.

ALBERT KOCH.